United States Patent [19]

Lawson

[11] Patent Number: 5,133,148

[45] Date of Patent: Jul. 28, 1992

[54] FISHING LURE APPARATUS

[76] Inventor: Michael J. Lawson, P.O. Box 754, Ayer, Mass. 01432

[21] Appl. No.: 714,503

[22] Filed: Jun. 13, 1991

[51] Int. Cl.$^5$ ............................................. A01K 85/00
[52] U.S. Cl. .................... 43/42.27; 43/43.1; 446/33
[58] Field of Search ............... 43/42.27, 2, 3, 42.28, 43/42.26, 43.1, 43.14; 446/32, 33, 31, 34, 454

[56] References Cited

U.S. PATENT DOCUMENTS

| | | | |
|---|---|---|---|
| 2,719,377 | 10/1955 | Bennett | 43/42.27 |
| 2,851,816 | 9/1958 | Gehrig | 43/43.1 |
| 3,698,121 | 10/1972 | Nordeen | 43/43.14 |
| 3,871,122 | 3/1975 | Jacobs | 43/42.27 |
| 4,232,469 | 11/1980 | Shiverdecker | 43/42.27 |
| 4,398,370 | 8/1983 | Allen | 446/31 |
| 4,941,279 | 7/1990 | Swanson | 43/43.1 |
| 5,046,979 | 9/1991 | Ragan et al. | 446/34 |

Primary Examiner—Richard K. Siedel
Assistant Examiner—Chuck Y. Mah
Attorney, Agent, or Firm—Leon Gilden

[57] ABSTRACT

A fishing lure to simulate a dragonfly in a hovering orientation above a body of water is presented to effect luring of various game fish. The dragonfly member is defined by an elongate body mounting a plurality of cluster hooks at spaced intervals along the bottom surface thereof. The dragonfly structure may be mounted in a suspended orientation relative to the body of water utilizing a flotation device, or alternatively utilizing a drive motor and associated receiver and transmitter to effect hovering orientation of the lure. Further, the lure may be formed with a concave nose and a container within the body to effect selective tippage and repositioning of the body during its displacement through the body of water.

4 Claims, 8 Drawing Sheets

FISHING LURE APPARATUS

BACKGROUND OF THE INVENTION

1. Field of the Invention

The field of invention relates to fishing lure apparatus, and more particularly pertains to a new and improved fishing lure apparatus wherein the same is arranged to simulate a dragonfly type configuration to attract game fish such as bass thereto.

2. Description of the Prior Art

Bass are frequently in feeding attracted to various flying insects positioned above a body of water. Such insects are presented as a flying insect, such as a dragonfly, provide appropriate attraction to the various bass. The instant invention attempts to provide an organization utilizing a remotely control hovering member to effect simulation of an appropriately configured flying insect. The prior art has provided remotely controlled structure for utilization in fishing apparatus as set forth in U.S. Pat. No. 4,856,222 to Hannam wherein a remotely controlled fishing apparatus utilizes a boat member to effect selective manipulation of the boat member through the water while maintaining a fishing line in association with the boat member.

U.S. Pat. No. 4,729,750 to Prusman sets forth a flying toy utilizing a remotely controlled structure for effecting manipulation of the flying toy.

As such, it may be appreciated that there continues to be a need for a new and improved fishing lure apparatus as set forth by the instant invention which addresses both the problems of ease of use as well as effectiveness in construction in attracting game fish thereto and this respect, the present invention substantially fulfills this need.

SUMMARY OF THE INVENTION

In view of the foregoing disadvantages inherent in the known types of fishing apparatus now present in the prior art, the present invention provides a fishing lure apparatus wherein the same presents a dragonfly simulation positioned in a hovering relationship above a body of water. As such, the general purpose of the present invention, which will be described subsequently in greater detail, is to provide a new and improved fishing lure apparatus which has all the advantages of the prior art fishing lure apparatus and none of the disadvantages.

To attain this, the present invention provides a fishing lure to simulate a dragonfly in a hovering orientation above a body of water to effect luring of various game fish. The dragonfly member is defined by an elongate body mounting a plurality of cluster hooks at spaced intervals along the bottom surface thereof. The dragonfly structure may be mounted in a suspended orientation relative to the body of water utilizing a flotation device, or alternatively utilizing a drive motor and associated receiver and transmitter to effect hovering orientation of the lure. Further, the lure may be formed with a concave nose and a container within the body to effect selective tippage and repositioning of the body during its displacement through the body of water.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing lure apparatus which has all the advantages of the prior art fishing lure apparatus and none of the disadvantages.

It is another object of the present invention to provide a new and improved fishing lure apparatus which may be easily and efficiently manufactured and marketed.

It is a further object of the present invention to provide a new and improved fishing lure apparatus which is of a durable and reliable construction.

An even further object of the present invention is to provide a new and improved fishing lure apparatus which is susceptible of a low cost of manufacture with regard to both materials and labor, and which accordingly is then susceptible of low prices of sale to the consuming public, thereby making such fishing lure apparatus economically available to the buying public.

Still yet another object of the present invention is to provide a new and improved fishing lure apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic view, taken along the lines 2—2 of FIG. 1 in the direction indicated by the arrows.

DESCRIPTION OF THE PREFERRED EMBODIMENT

With reference now to the drawings, and in particular to FIGS. 1 to 10 thereof, a new and improved fishing lure apparatus embodying the principles and concepts of the present invention and generally designated by the reference numerals 10, 10a, and 10b will be described.

More specifically, the fishing lure apparatus 10 of the instant invention essentially comprises an elongate longitudinally aligned body 11, including a wing flange 12 fixedly and orthogonally mounted relative to an axis defined by the body 11 adjacent a forward terminal end thereof. A drive motor 13 is mounted within the body and includes a propeller 14 for selective rotation and propulsion of the body. A rudder 16, with an elevator tail section 15, is provided, with each including a respective rudder flap 16a and tail flap 15a assembly to effect selective guidance of the airborne lure. A battery 17 is positioned within the body in association with a receiver 18 operative with an associated transmitter 24 (see FIG. 5) to effect control of the device in flight. A respective first, second, and third servo-mechanism 19, 20, and 21 each include a respective first, second, and third drive link 19a, 20a, and 21a to effect selective actuation and control of the respective drive motor 13, elevator tail portion 15a, and rotor flaps 16a. The first servo-mechanism 19 may include a throttle control 13a, as illustrated in diagrammatic form in FIG. 4.

Figure 1:
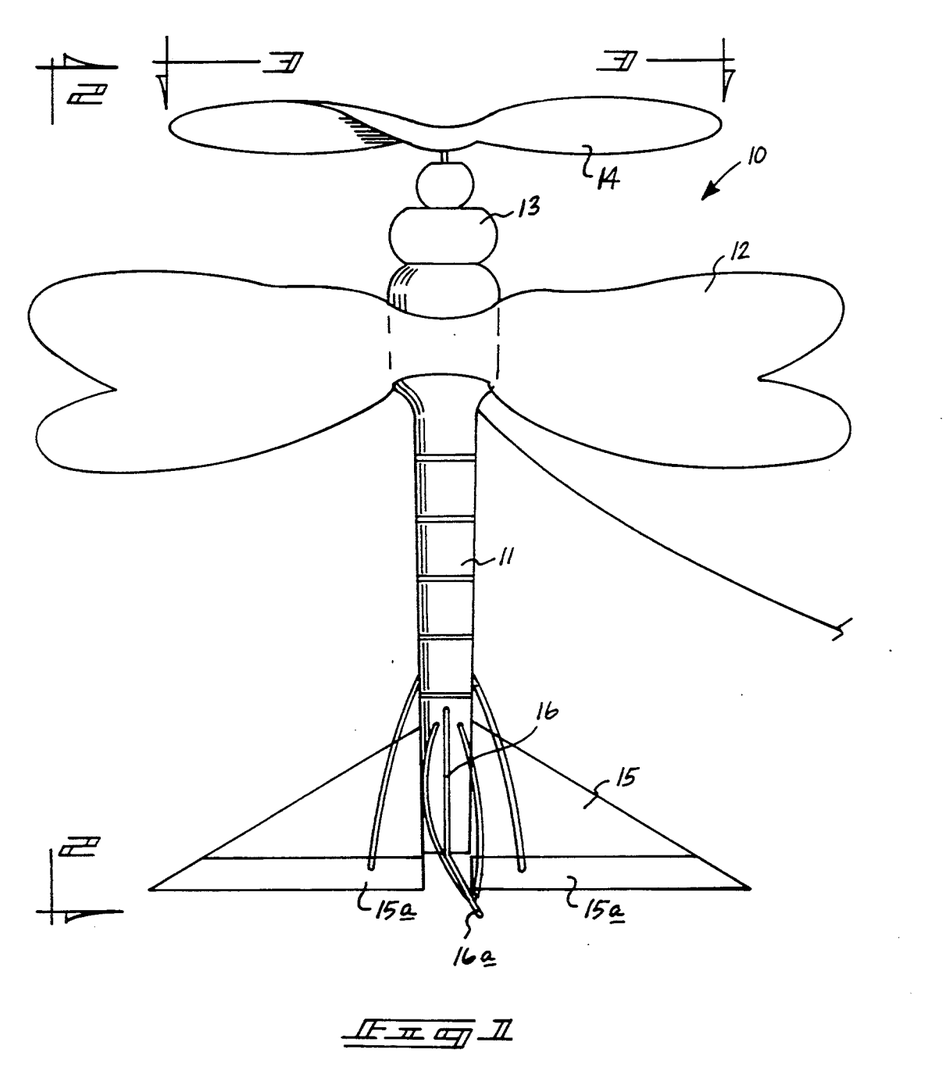
FIG. 1 is a top orthographic view of the instant invention.
Figure 3:
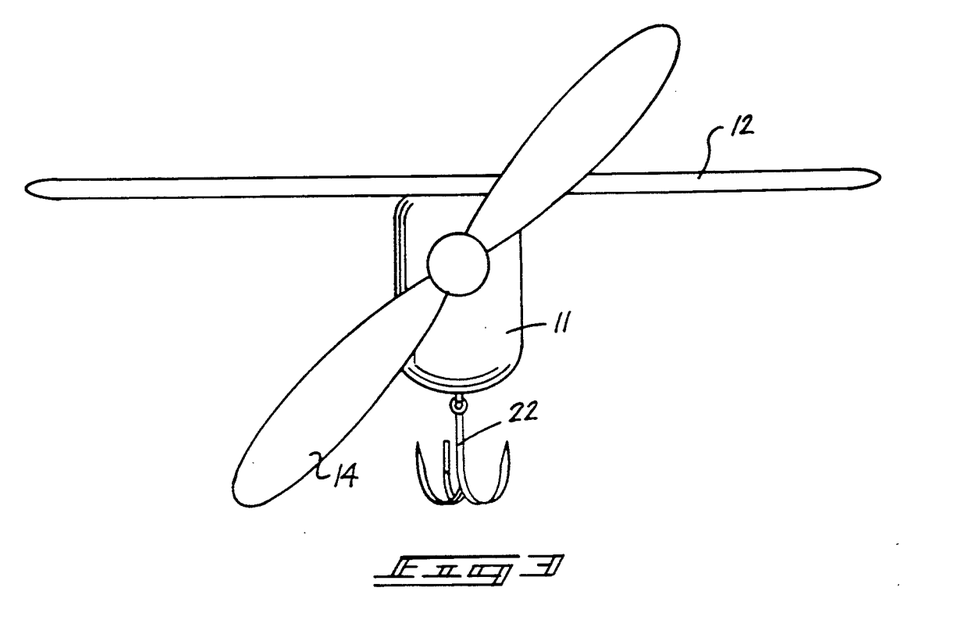
FIG. 3 is an orthographic view, taken along the lines 3—3 of FIG. 1 in the direction indicated by the arrows.
Figure 4:
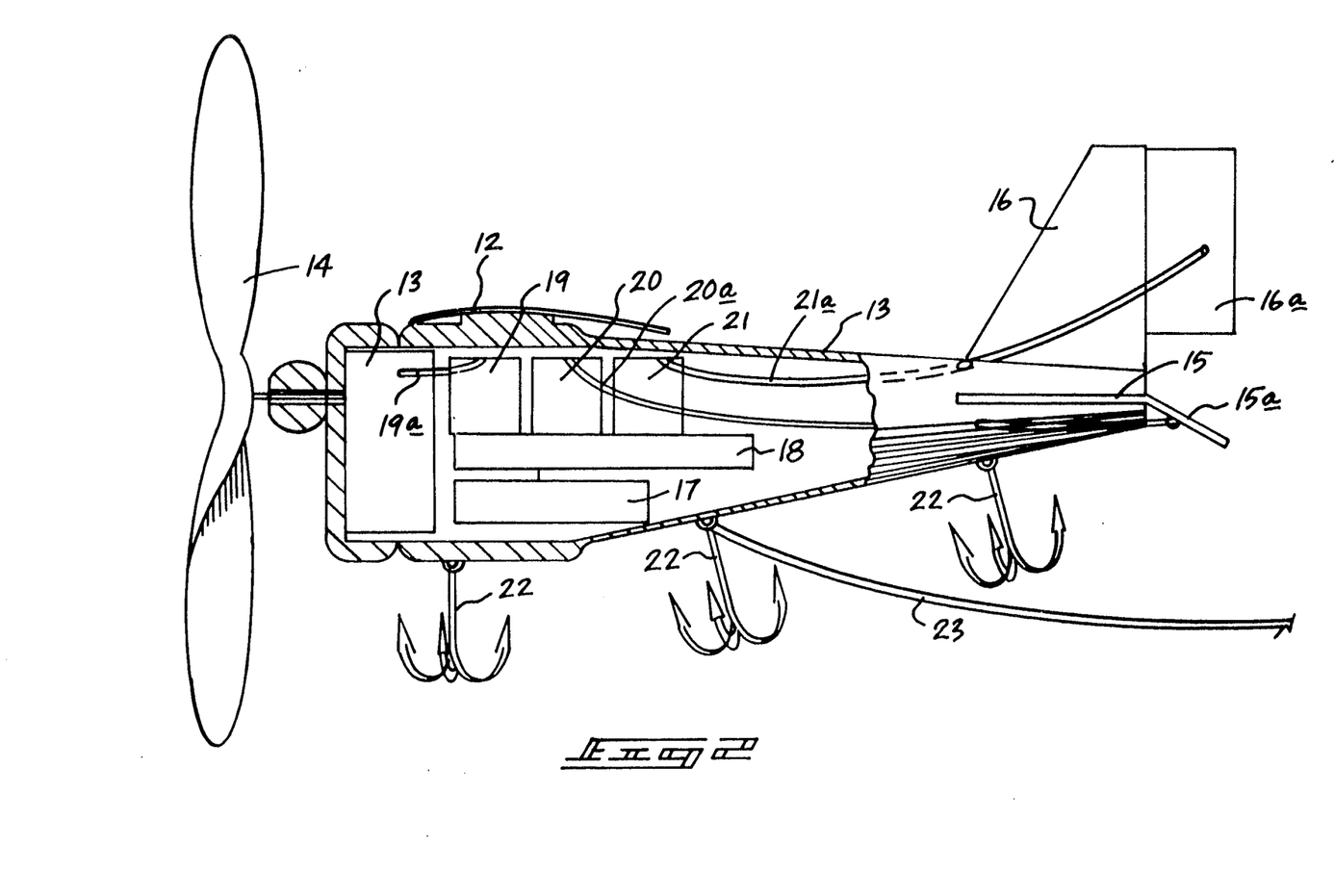
FIG. 4 is a diagrammatic illustration of the control mechanism of the invention, as illustrated in FIG. 1.
Figure 5:
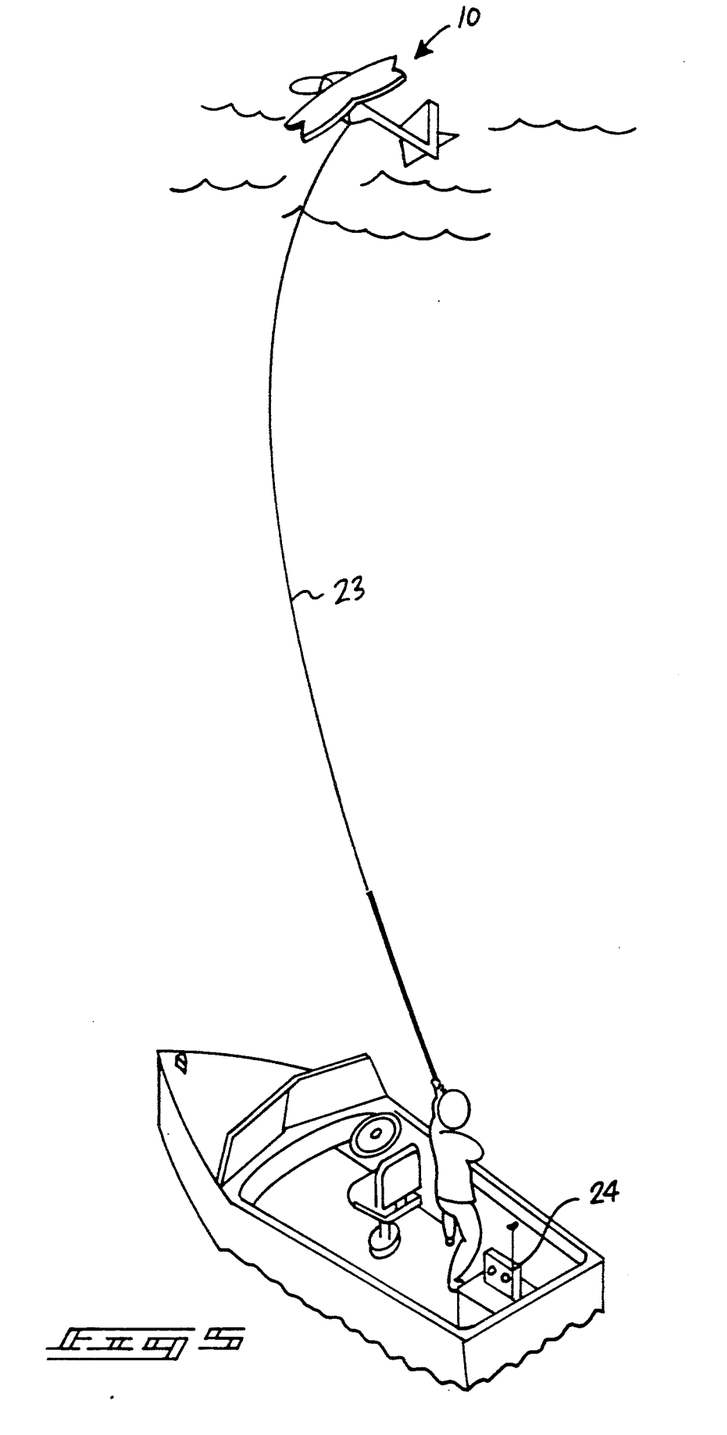
FIG. 5 is an isometric illustration of the invention in use.

In this manner, a fisherman mounted within a boat or other support may mount a fishing tether line 23 to a bottom surface of the body 11, wherein a plurality of hook members such as cluster hook members are arranged to snare a game fish, such as a bass, when drawn to the lure apparatus.

Figure 6:
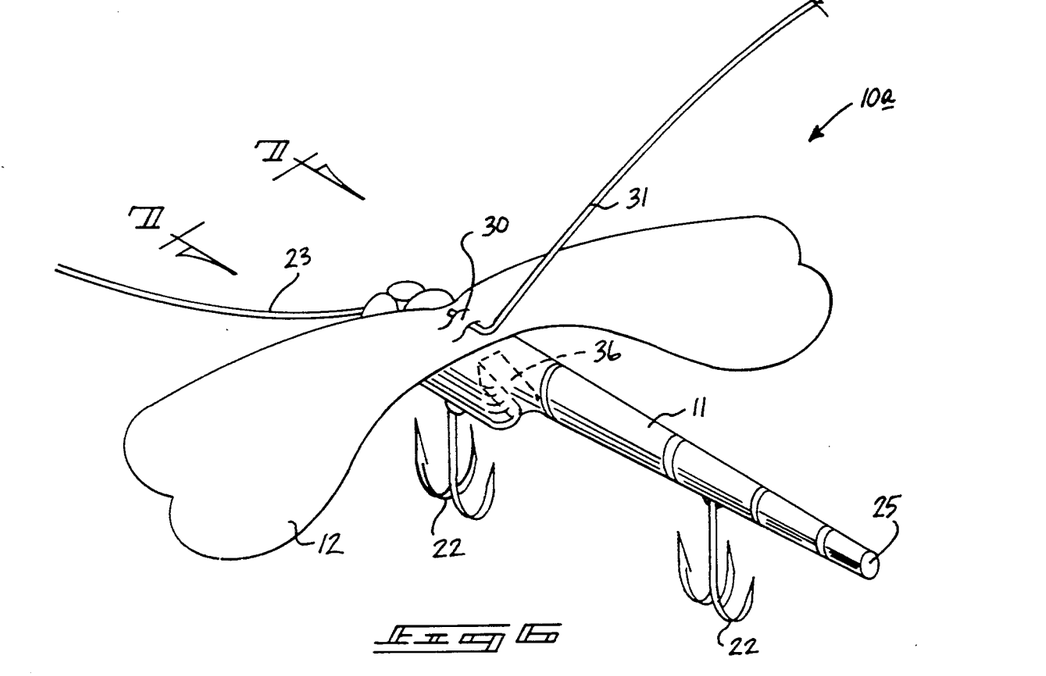
FIG. 6 is an isometric illustration of a modification of the invention.
Figure 7:
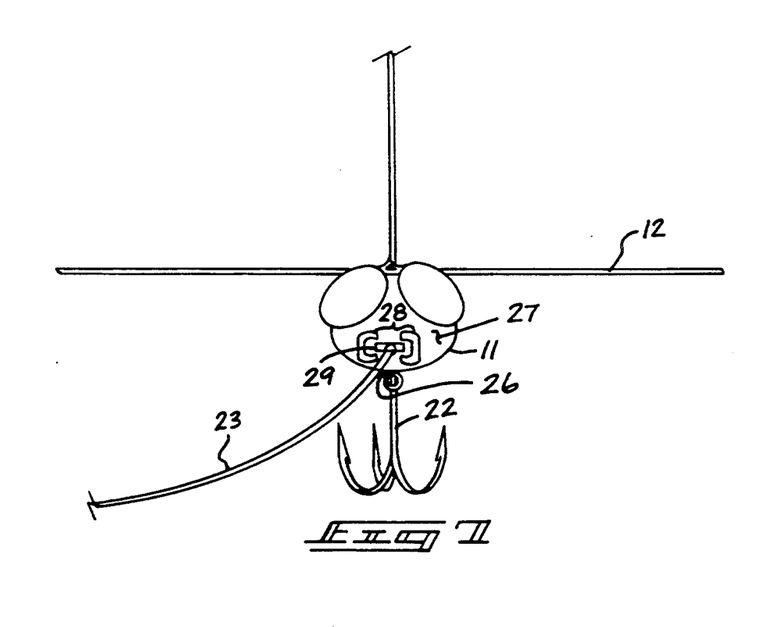
FIG. 7 is an orthographic view, taken along the lines 7—7 of FIG. 6 in the direction indicated by the arrows.
Figure 8:
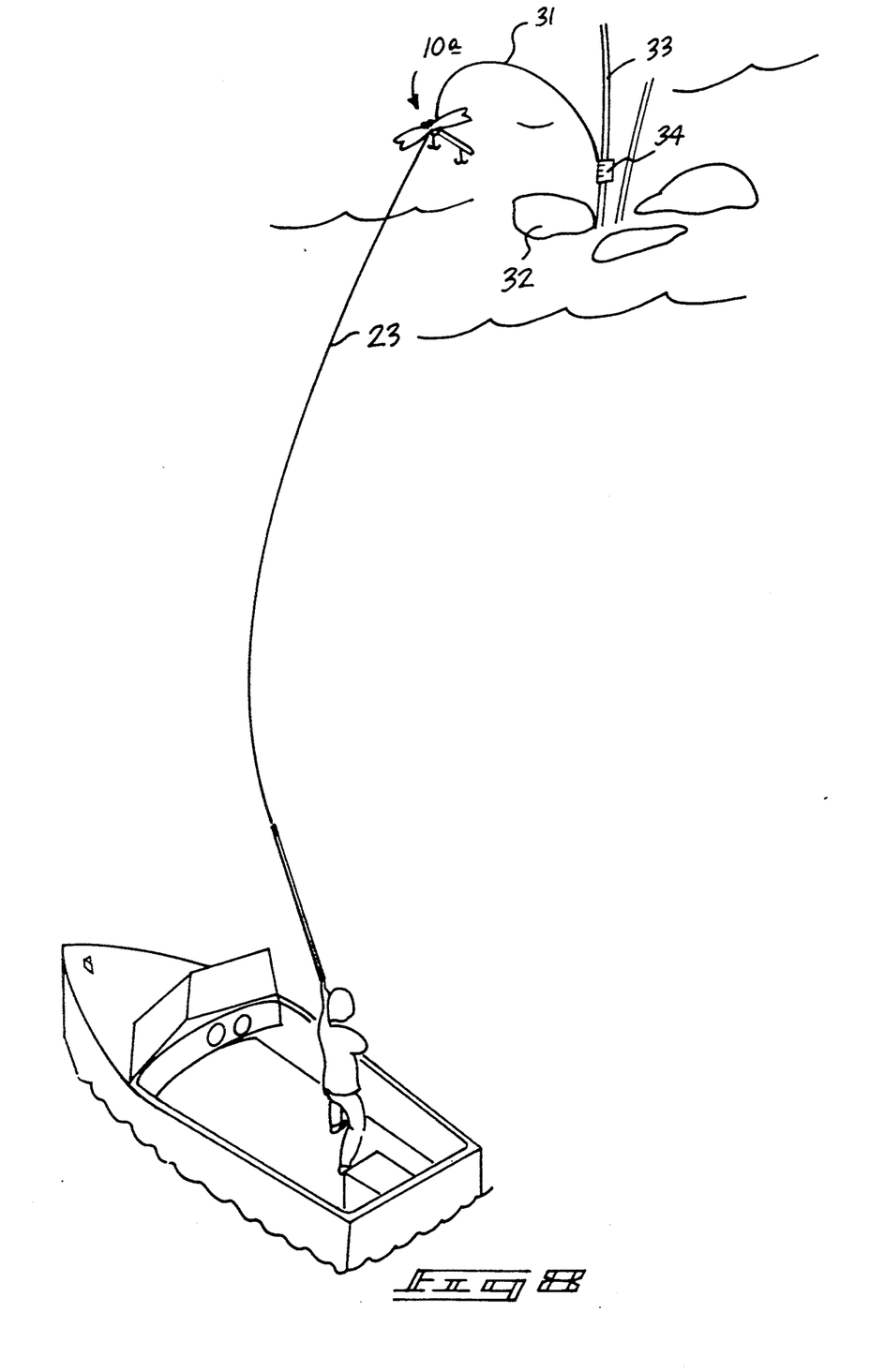
FIG. 8 is an isometric illustration of the modification of the invention in use.

FIGS. 6-8 illustrate a modified lure apparatus 10a, wherein the elongate body 11a includes a rear terminal end 25, with the body 11 including a body cavity 27. A body slot 26 is directed through a bottom surface of the elongate body 11 and includes a guide track 28 defined by confronting "C" shaped guides within the body cavity 27. A guide follower 29 is contained within the guide track structure 28, with the fishing tether line 23 mounted to the follower 29. A wing slot 30 is positioned medially of the wing 12 overlying the body 11, with a flexible memory retentent support rod 31 projecting through the wing slot 30 and suspending the body 11 above an associated water surface. A flotation member 32 is accordingly in floating contact with the body of water, with a flotation member support rod 33 mounting a rear terminal end of the body support rod 31 relative to the flotation member support rod 33. A clasp member 34 mounted about the flotation member support rod 33 and the body support rod 31 secure the rods together. The fishing tether line 23 guided within the associated slot 30 and track 29 that are of coextensive dimensions permit repositioning of the body by an individual effecting varying tension rates and pulls to the tether line 23. The hook members 22 are operative to snare an associated game fish as noted above.

Figure 9:
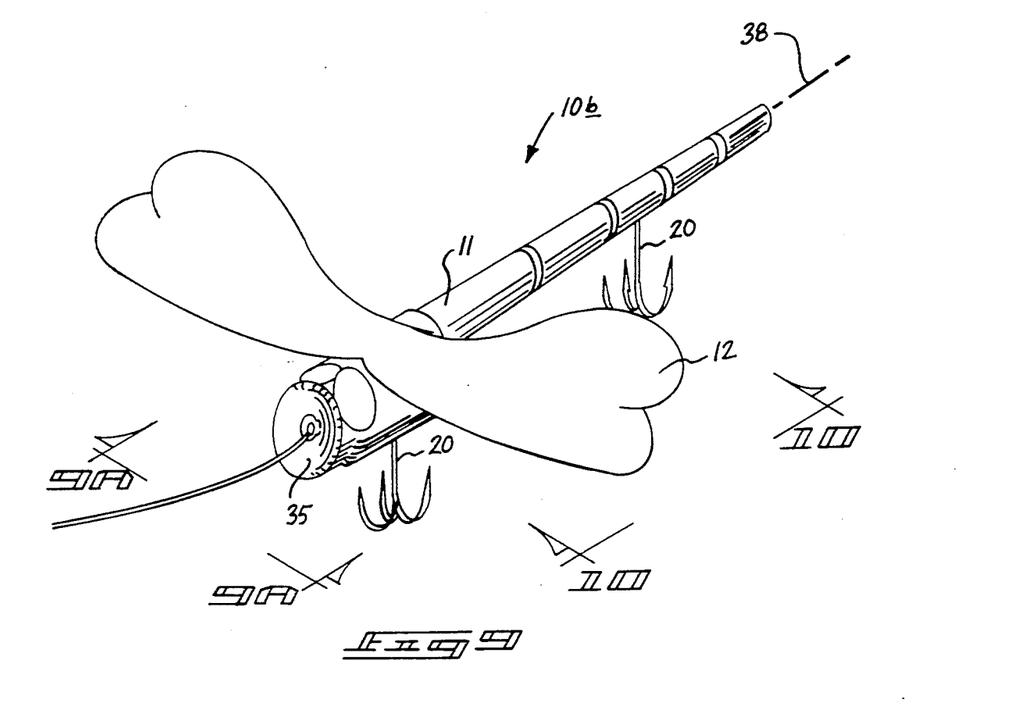
FIG. 9 is an isometric illustration of a further modification of the invention.
Figure 9A:
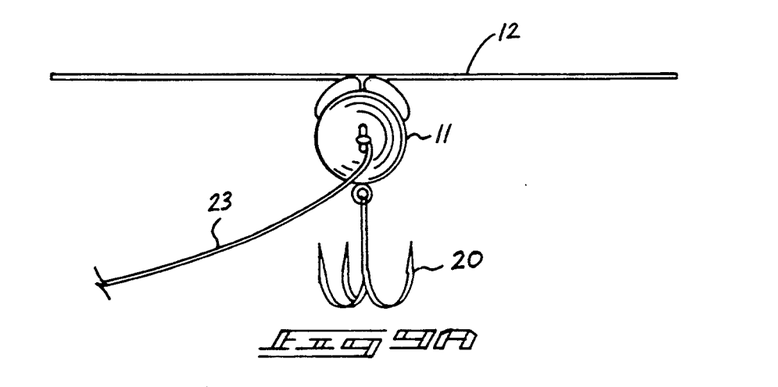
FIG. 9a is an orthographic view, taken along the lines 9a—9a of the invention as set forth in FIG. 9.
Figure 10:
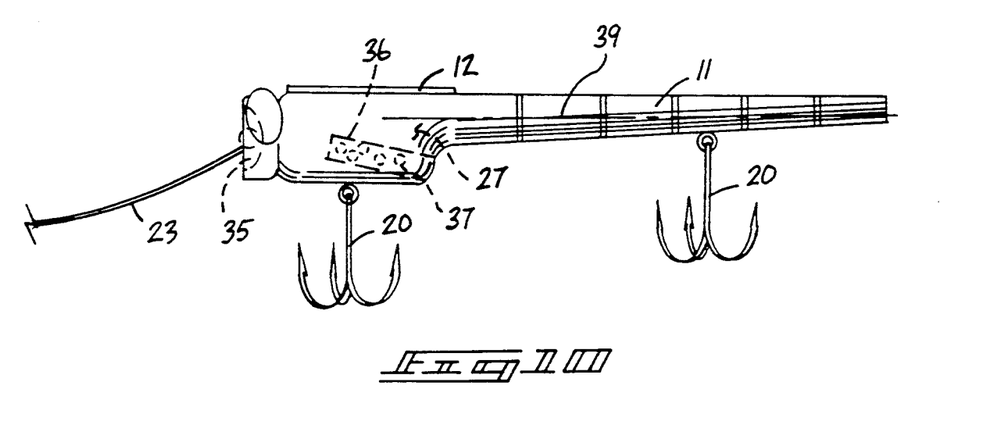
FIG. 10 is an orthographic view, taken along the lines 10—10 of FIG. 9 in the direction indicated by the arrows.

The further modified apparatus 10b, as illustrated in FIGS. 9, 9a, and 10, utilize the elongate body 11 defined by an appropriate body longitudinal axis 38 and includes a concave body nose 35 to provide audible impact with a body of water for fish attraction, with an incline container 36 fixedly mounted within the body containing a plurality of spherical weights 37 therewithin. The inclined container 36 is inclined to define an acute included angle between a forward end of the container 36 and the body longitudinal axis 38, whereupon the spherical weights are shifted to effect and impart various gyratory motions to the body in use. It should be noted that the inclined container 36 and spherical weights contained therewithin are also optionally mounted within the apparatus 10a, as set forth in the FIGS. 6-8, to further permit imparting of the same gyratory motion to the elongate body 11 in use and mounted in the same manner as illustrated in FIG. 10.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing lure apparatus, comprising,
   an elongate longitudinally aligned body, the body including a body longitudinal axis, and
   a wing flange, the wing flange positioned to a top surface of the body adjacent a forward terminal end thereof, with the wing flange extending laterally to each side of the elongate body, and
   the elongate body including a bottom surface, and a plurality of hook members mounted to the bottom surface of the elongate body at spaced intervals, and support means mounted to the elongate body for suspending the elongate body relative to an associated water surface, and a flexible tether line, the flexible tether line mounted to the elongate body, and the support means includes a drive motor, the drive motor mounted to a forward terminal end of the elongate body, the drive motor including a propeller directed exteriorly thereof, and the support means further including an elevator tail portion mounted to the rear terminal end of the elongate body, and a rudder assembly mounted adjacent the elevator tail portion, and an elevator servo-mechanism means for effecting manipulation of the tail portion, and a rudder servo-mechanism means for effecting manipulation of the rudder for maneuvering the elongate body, and a transmitter in operative communication with the elevator servo-mechanism means and the rudder servo-mechanism means for their selective actuation, and the elongate body includes a body slot directed through the bottom surface, the body slot positioned below a guide track, the guide track including a plurality of confronting "C" shaped guide members, the "C" shaped guide members including a guide track follower captured therebetween, and the guide track follower including a tether line secured thereto.

2. An apparatus as set forth in claim 1 including a wing slot, the wing slot positioned medially of the wing flange above the elongate body, and a flexible memory retentent body support rod mounted to the wing slot at a forward terminal end of the body support rod for mounting the elongate body in a spaced relationship relative to a body of water.

3. An apparatus as set forth in claim 2 including a flotation member for selective flotation upon the body of water, the flotation member including a flotation member support rod, the flotation member support rod including a clasp member, the clasp member fixedly secured to the flotation member support rod and to the body support rod spaced from the wing slot to maintain the elongate body in a spaced relationship relative to the body of water.

4. An apparatus as set forth in claim 3 wherein the elongate body includes an inclined container contained therewithin, the inclined container oriented at an acute included angle between the body longitudinal axis and the inclined container, and the inclined container including a plurality of spherical weight members slidably mounted therewithin to effect gyration of the elongate body upon varying tension applied to the tether line.

* * * * *